US012543010B2

(12) United States Patent
Brendel et al.

(10) Patent No.: US 12,543,010 B2
(45) Date of Patent: Feb. 3, 2026

(54) HEARING INSTRUMENT SYSTEM

(71) Applicant: Sivantos Pte. Ltd., Singapore (SG)

(72) Inventors: Johannes Brendel, Erlangen (DE); Bernd Matschkal, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 278 days.

(21) Appl. No.: 18/331,330

(22) Filed: Jun. 8, 2023

(65) Prior Publication Data

US 2023/0403519 A1 Dec. 14, 2023

(30) Foreign Application Priority Data

Jun. 8, 2022 (DE) ..................... 10 2022 205 856.9

(51) Int. Cl.
*H04R 25/00* (2006.01)
*H04B 10/50* (2013.01)

(52) U.S. Cl.
CPC ......... *H04R 25/558* (2013.01); *H04R 25/505* (2013.01); *H04R 25/554* (2013.01); (Continued)

(58) Field of Classification Search
CPC .............. H04R 2225/31; H04R 25/556; H04R 25/602; H04R 25/558; H04R 25/609; (Continued)

(56) References Cited

U.S. PATENT DOCUMENTS

| | | | | |
|---|---|---|---|---|
| 11,595,767 B1 * | 2/2023 | Rüfenacht | ............ | H04R 25/602 |
| 2013/0016861 A1 * | 1/2013 | Kaempf | .................... | H02J 7/00 381/315 |
| 2019/0306637 A1 | 10/2019 | Aazami et al. | | |

FOREIGN PATENT DOCUMENTS

DE 102011107780 A1 1/2013

OTHER PUBLICATIONS

Dietz, Paul et al.: Very low-cost sensing and communication using bidirectional LEDs. In: UbiComp 2003: ubiquitous computing : 5th international conference, Oct. 12-15, 2003, Seattle, WA, USA I ed. by Dey, Anind K. Berlin : Springer, 2003 (Lecture notes in computer science; 2864). S. 175-191.—ISBN 978-3-540203-01-8; 3-540-20301-X. DOI:10.10071978-3-540-39653-6_14.

* cited by examiner

*Primary Examiner* — Sunita Joshi
(74) *Attorney, Agent, or Firm* — Laurence A. Greenberg; Werner H. Stemer; Ralph E. Locher

(57) ABSTRACT

A hearing instrument system includes a hearing instrument having an input transducer receiving signals characteristic of acoustic events and converting the signals into input signals, an output transducer outputting output signals derived from input signals, a controller processing input signals and generating output signals, a housing for the input transducer and controller, and an LED connected to the controller to output and receive optical signals, The controller derives information from an optical signal received by the LED and uses the information to continue hearing instrument operation. A third-party device forms a box-shaped charger having a charging interior for the hearing instrument. The third-party device transmits a charging light signal into the charging interior. The controller takes charging light signal reception to indicate the hearing instrument being in the charging interior and deactivates signal processing, sound output and/or sound capture or switches off the hearing instrument.

8 Claims, 2 Drawing Sheets

(52) U.S. Cl.
CPC ......... *H04R 25/604* (2013.01); *H04R 25/609* (2019.05); *H04R 25/65* (2013.01); *H04B 10/502* (2013.01); *H04R 2225/55* (2013.01); *H04R 2225/61* (2013.01)

(58) Field of Classification Search
CPC .. H04R 25/505; H04R 25/554; H04R 25/604; H04R 25/65
See application file for complete search history.

HEARING INSTRUMENT SYSTEM

CROSS-REFERENCE TO RELATED APPLICATION

This application claims the priority, under 35 U.S.C. § 119, of German Patent Application DE 10 2022 205 856.9, filed Jun. 8, 2022; the prior application is herewith incorporated by reference in its entirety.

FIELD AND BACKGROUND OF THE INVENTION

The invention relates to a hearing instrument system.

Hearing instruments are normally used to output an audio signal to the hearing of the wearer of the respective hearing instrument. The output is provided by an output transducer, usually acoustically by way of airborne sound by using a loudspeaker (also referred to as a "receiver"). Such hearing instruments are often used as so-called hearing aids (also: hearing devices). To that end, the hearing instruments usually include an acoustic input transducer (in particular a microphone) and a signal processor, which is configured to use at least one signal processing algorithm, normally stored on a user-specific basis, to process the input signal (also: microphone signal) generated by the input transducer from the ambient sound in such a way that a hearing loss of the wearer of the hearing instrument is at least partially compensated for. In particular in the case of a hearing aid, the output transducer may be not only a loudspeaker but also alternatively a so-called bone conduction receiver or a cochlear implant, which are configured to mechanically or electrically couple the audio signal into the hearing of the wearer. The term "hearing instrument" also additionally covers in particular devices such as e.g. so-called tinnitus maskers, headsets, headphones and the like.

Typical configurations of hearing instruments, in particular hearing devices, are behind-the-ear ("BTE") and in-the-ear ("ITE") hearing instruments. Those names are geared to the intended wearing position or wearing style. As such, behind-the-ear hearing instruments have a (main) housing that is worn behind the pinna. A distinction can be drawn in that case between models having a loudspeaker which is disposed in the housing—the sound output to the ear is normally provided by using a sound tube worn in the auditory canal—and models that have an external loudspeaker placed in the auditory canal. By contrast, in-the-ear hearing instruments have a housing that is worn in the pinna or even completely in the auditory canal.

A popular energy source for hearing instruments is (non-rechargeable) batteries, frequently in the form of zinc-air primary cells. Modern hearing instruments also increasingly have secondary cells (also: "storage batteries," "accumulators" or "rechargeable batteries"), however. Those are regularly permanently installed in the housing of the hearing instrument. For charging, the hearing instrument is connected to a charger, electrically or contactlessly, in the latter case by using induction coils, for example.

Additionally, the signal processor (frequently also referred to more generally as the "controller") of modern hearing instruments is programmable at least to a certain extent, in particular in order—preferably in the case of hearing devices—to be able to adjust the signal processing on a user-specific basis. To that end, hearing instruments expediently have an appropriate (electrical) interface.

However, electrical contacts have the disadvantage that they need to be protected from contamination, in particular from moisture and wet conditions, in order to prevent short circuits and/or corrosion. Such protection regularly requires structural complexity and/or the use of additional components (contacts, seals and the like).

SUMMARY OF THE INVENTION

It is accordingly an object of the invention to provide a hearing instrument system, which overcomes the hereinafore-mentioned disadvantages of the heretofore-known systems of this general type and which provides an improved hearing instrument.

This object is achieved according to the invention by way of a hearing instrument system having the features of the independent claim. Further advantageous and in some cases inherently inventive embodiments and developments of the invention are outlined in the subclaims and the description that follows.

With the foregoing and other objects in view there is provided, in accordance with the invention, a hearing instrument system comprising a hearing instrument and a third-party device, the hearing instrument including an input transducer for receiving signals (in particular ambient sound) that are characteristic of acoustic events and for converting the signals into corresponding input signals. The hearing instrument also includes an output transducer for outputting output signals derived from the input signals and also a controller configured to process the input signals and to generate ("derive") the output signals therefrom. Furthermore, the hearing instrument also includes a housing for housing the input transducer and the controller and optionally also the output transducer. Moreover, the hearing instrument includes an (at least one) LED connected up to the controller both in order to output optical signals and to receive optical signals. The controller is configured to derive information from an optical signal received by using the LED and to use the information to continue to operate the hearing instrument.

The hearing instrument is preferably a hearing aid and is therefore also referred to as the "hearing device" below. The input transducer is preferably a microphone. The output transducer is formed in particular by a loudspeaker that converts the output signals into airborne sound.

The LED (short for light-emitting diode) is preferably a status LED that is present anyway on a large number of hearing devices in order to display the operating state. In this case in particular, the use of the LED for receiving optical signals facilitates advantageous multiple usage of components. In particular, such use of LEDs as a light-sensitive receiver (that is to say preferably as a light sensor) is associated with comparatively low wiring complexity, which means that hardly any additional complexity arises for implementing such a sensor.

In one preferred embodiment, the controller is configured to take the derived information as a basis for altering a setting parameter for processing the input signals. To put it another way, the LED is used in conjunction with the relevant setup (in particular programming) of the controller as an adjustment or fitting interface of the hearing device.

Additionally or alternatively, the controller is configured to take the derived information as a basis for altering an operating state of the hearing instrument. By way of example, it is possible to use an actively transmitted light signal to indicate to the controller that the hearing device is located in a charger—in particular if the hearing device includes a rechargeable battery. In this case, the charger is preferably configured to output the applicable light signal (this is also described again more thoroughly below). In this case, the controller is expediently configured to switch off the hearing device (and thus in particular itself), but at least to deactivate the sound output through the loudspeaker described above or the signal processing of the input signals to produce the output signals as a whole.

As a further addition or on the other hand alternative, the controller is configured to use the LED to use received light as an indication of the surroundings of the hearing device and preferably then to alter the operating state of the hearing device. In particular, the controller is configured to regard complete darkness, that is to say the absence of detectable radiation at least in the visual wavelength range, possibly even in narrow, adjoining wavelength ranges, as an indication that the hearing device is disposed in a sealed box (for example a charger, a storage box or the like), and then to at least deactivate a sound output. This makes it possible to prevent feedback from occurring inside the box in the case of acoustic transducers, which is regularly manifested by a shrill whistling sound and may be particularly undesirable at night, for example.

In a further expedient embodiment, the controller is configured to actuate the LED— in particular in addition to operating the LED to visually display an operating state, a charging state of a rechargeable battery that may be present, and the like—to emit a modulated light signal (for example in the form of flashing encoded in a Morse-like manner) for bidirectional communication with a third-party device (optionally the aforementioned charger). As a result, the hearing device can also transmit information to the third-party device.

In order to facilitate the transmission of data or information by using the light signals in a manner that is as robust as possible toward external influences, the controller and in particular also a corresponding counterpart of the third-party device are expediently configured to output or, on reception, to "understand" (i.e. to be able to analyze) light impulses in the form of a "spread" (i.e. comparatively long) sequence (succession), in concrete terms that is to say specifically encoded sequences.

In one expedient embodiment, the controller is also configured to improve reception of the light signals of the third-party device even when transmitting its own light signals and/or in the event of mere visual display of the operating state by using the LED, to provide the light signals or the display of the operating state with pauses and to use these pauses in order to potentially receive the light signals of the third-party device. By way of example, transmission time frames of approximately 10 ms (in particular alternation of glow and glow pause with a duration of 10 ms each) are sufficient in this case. A resultant high-frequency "flickering" is advantageously imperceptible or only barely perceptible to the human eye, however, and so this is not found to be irritating. In particular, a corresponding counterpart of the third-party device is also appropriately configured. Light signals received during the pauses can in particular initially be used (optionally as part of a kind of "pairing") in order to synchronize the light signals (for example correction of a time drift between the controller of the hearing device and the third-party device), for example, and can subsequently be used to actually interchange information. Such an approach is fundamentally known from the field of communications engineering.

In one preferred embodiment, the LED is connected up to a general input/output of the controller (also referred to as a "GPIO" or "general purpose input/output"), in particular of a microprocessor (optionally also in the form of an ASIC) of the controller. This has the advantage that a GPIO such as this is regularly present anyway, and therefore a function of the controller or microcontroller can be used, without requiring additional complexity. In particular, the LED is connected in series with a resistor between two GPIO pins. Such an interconnection is described by way of illustration in Dietz, Paul; Yerazunis, William; Leigh, Darren: Very Low-Cost Sensing and Communication Using Bidirectional LEDs; UbiComp 2003: Ubiquitous Computing, 5th International Conference, Seattle, WA, USA, Oct. 12-15, 2003, Proceedings. 175-191. doi: 10.1007/978-3-540-39653-6_14.

The hearing instrument system according to the invention includes the hearing instrument (hearing device) described above and a (in particular the aforementioned) third-party device. The third-party device is configured (preferably by using software or circuitry) to communicate with the hearing device by using an optical data transmission arrangement by using light signals (in particular in the form of light impulses). As described above, the hearing device uses the LED to receive the light signals. The hearing instrument system therefore includes the features of the hearing device described above and also the resulting advantages in equal measure.

In one preferred embodiment, the hearing instrument and the third-party device are configured to communicate bidirectionally by using the LED of the hearing instrument, or by using the optical data transmission arrangement. That is to say that the data transmission arrangement is also configured both to send and to receive data.

In particular, the third-party device forms a box-like or box-shaped charger having a charging interior for the hearing instrument. When used as intended, the charging interior is preferably sealed by using a lid of the charger. The third-party device is configured to transmit a charging light signal into the charging interior. The controller of the hearing instrument is configured to take reception of this charging light signal as a basis for identifying that the hearing instrument is disposed in the charging interior and for taking a measure related thereto. In particular, the controller in this case is configured (preferably in the case of the hearing aid) to deactivate a signal processing, a sound output and/or a sound capture. The controller may optionally also be configured to switch off the hearing device. These measures can effectively prevent acoustic feedback of the sound output to the sound capture, which is regularly manifested by an undesirable whistling sound that is in particular found to be shrill.

In a further expedient embodiment, the hearing instrument is configured to set up a wireless bidirectional communication connection to a fourth device (or a further third-party device) having Internet capability. The charger is configured to access a network address by using the optical data transmission arrangement of the charger through the hearing instrument. This network address is for example a network drive, a website, an online database, a cloud (specifically a cloud server) or the like. The hearing device therefore allows the charger to access such resources, or provides the charger with access to such resources. By way of example, the charger can transfer log data or the like to a database (for example cloud) of the manufacturer or can retrieve firmware updates. In particular, the charger can therefore advantageously be configured without an additional (dedicated) network interface (for example Bluetooth, WLAN or the like), which means that complexity and components can in turn be saved in this case.

In a further expedient embodiment, the third-party device is configured to transmit programming data to the hearing instrument by using the optical data transmission arrangement. The third-party device may be configured as a dedicated programming device that is coupled to a PC or another device on which programming software for the hearing device is installed, for example, and thus forms an interface to the hearing device.

In the cases described above, the optical data transmission arrangement of the respective third-party device is formed in particular by an LED and a (light) sensor (for example a photocell). Alternatively, the data transmission arrangement may also be formed by a camera and a "flashbulb" or by a front camera (as light sensor) and a screen (as light source) of a smartphone having appropriate software that controls, or monitors, the output of the light signals and the reception thereof. The smartphone may optionally also have the programming software described above installed on it, with the result that the smartphone is an autonomous programming device.

The conjunction "and/or" is intended to be understood, in this case and below, to mean in particular that the features combined by this conjunction may be in both collective form and in a form as alternatives to one another.

Other features which are considered as characteristic for the invention are set forth in the appended claims.

Although the invention is illustrated and described herein as embodied in a hearing instrument system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
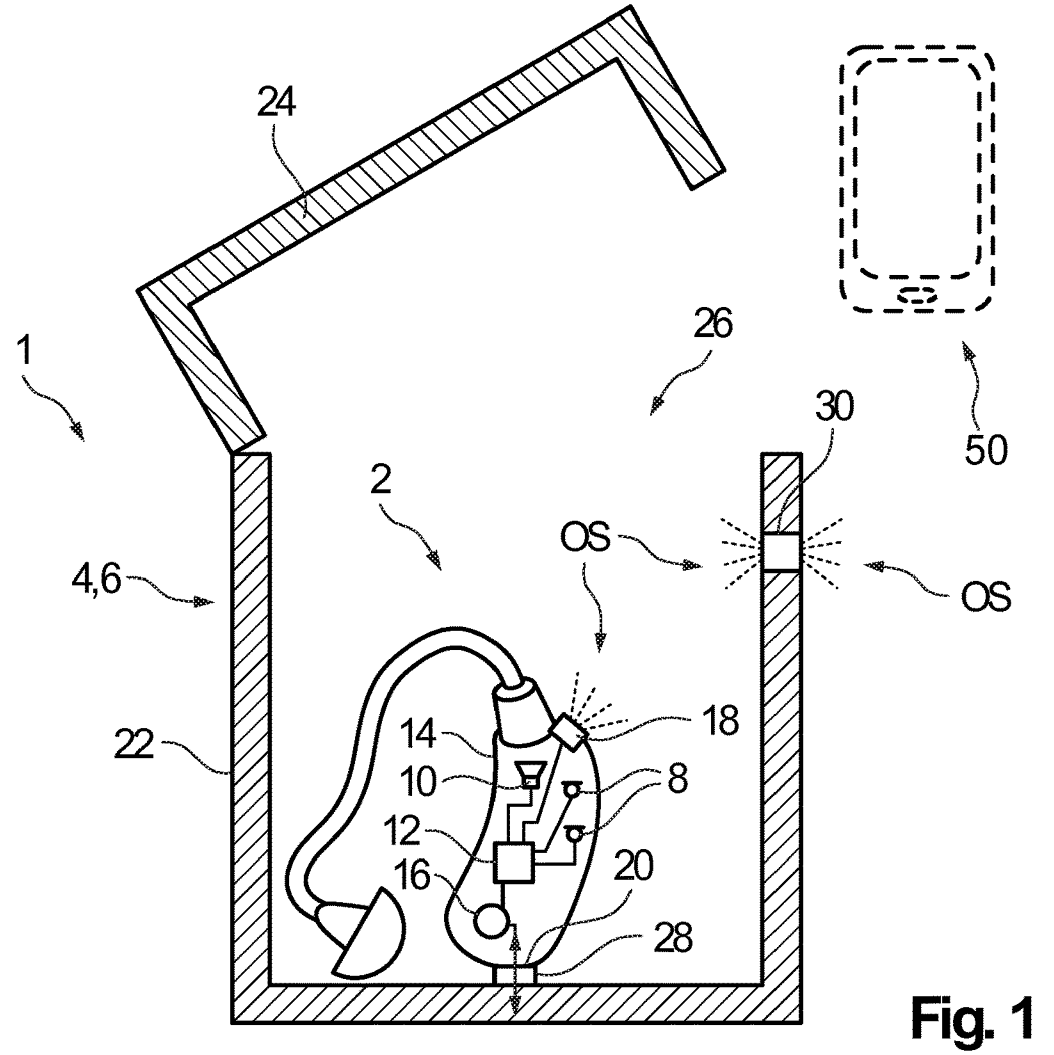
FIG. 1 is a diagrammatic, vertical-sectional view of a hearing instrument system including a hearing instrument and a third-party device, which forms a charger.

Referring now in detail to the figures of the drawings, in which mutually corresponding parts (and quantities) are provided with the same reference signs, and first, particularly, to FIG. 1 thereof, there is seen a diagrammatic illustration of a hearing instrument system (system 1 for short). The system 1 includes a hearing instrument, in the form of a hearing aid (hearing device 2 for short) in this case, and a third-party device 4 (that is to say a further device), in the form of a charger 6 in this case.

The hearing device 2 is in the form of a behind-the-ear hearing aid (also: "BTE") by way of illustration in this case. The hearing device 2 includes at least one input transducer, specifically two in this case, each of which is formed by a microphone 8. These microphones 8 are used to receive ambient sounds and to convert them into corresponding input signals. In addition, the hearing device has an output transducer in the form of a loudspeaker 10 that is used for outputting output signals derived from the input signals. Furthermore, the hearing device 2 includes a controller 12 that is configured to process the input signals (for example to filter and/or amplify them on a frequency-dependent and user-dependent basis) and thus to generate the output signals therefrom. Moreover, the hearing device 2 has a housing 14 for housing the microphones 8, the loudspeaker 10 and the controller 12. In order to supply energy, the hearing device 2 also has a rechargeable battery 16. Additionally, the hearing device 2 includes an LED 18 connected to the controller 12, both in order to output optical signals OS and to receive optical signals OS. The controller 12 is configured to derive information from an optical signal OS received by the LED 18 and to use that information to continue to operate the hearing instrument 2. In order to charge the battery 16, the hearing device 2 additionally includes—by way of illustration in this case—an electrical charging interface 20.

The charger 6 is configured as a box and includes a pot-shaped lower part 22 and a lid 24, which together reversibly seal a charging interior 26 in which the hearing device 2 is disposed in the intended charging state. The charging interior 26 has an electrical charging connection 28 disposed in it that is used to make contact with the charging interface 20 in order to charge the battery 16 (see FIG. 1).

Additionally, the charger 6 also includes an LED 30. The LED 30 is used firstly to display a charging mode, for example by using a flash sequence, indicating that the hearing device 2 is currently being charged, and by using a continuous (at least appearing continuously for a user) glow (or optical signal OS). The LED 30 is also used to communicate with the hearing device 2. To this end, the LED 30 is disposed, and for example coupled to light guide elements (not shown), in such a way that the optical signals OS that are output are emitted both to the outside and into the charging interior 26.

By way of example, the actual optical signal OS that is transmitted is a flash sequence provided by using the respective LED 18 or 30, the duration of the pauses being of such brevity, however, that they are not visually detectable by a user. This preserves the impression of a continuous glow from the respective LED 18 or 30.

In one simple exemplary embodiment, the controller 12 detects the signals OS of the LED 30 and identifies from them that the hearing device 2 is disposed in the charging interior 26, and then switches off the sound output through the loudspeaker 10 in order to avoid feedback whistling. The optical signals OS emitted by the LED 30 are thus used as a "charging light signal" in this case.

In a further exemplary embodiment, the charger 6 and the hearing device 2 interchange more extensive information, however. By way of example, so-called log data can be interchanged. Similarly, it is possible—depending on whether the hearing device 2 or the charger 6 is connected indirectly or directly, for example by using a wireless connection, to a smartphone or a router (which are both a "fourth device")— for firmware updates to be transmitted from the hearing device 2 to the charger 6 or vice versa. Since modern hearing devices 2 generally have an option to connect to a smartphone 50 or the like anyway, which is illustrated as a fourth device in FIG. 1, the charger 6 can advantageously be configured without such an interface in this instance and, during the charging process, can use the hearing device 2 as a "switching center," router or the like, for example in order to make contact with a cloud server of the manufacturer and to interchange data therewith. The data are then sent between the cloud server and the charger 6 by way of the hearing device 2 and the smartphone 50 coupled thereto, for example.

Figure 2:
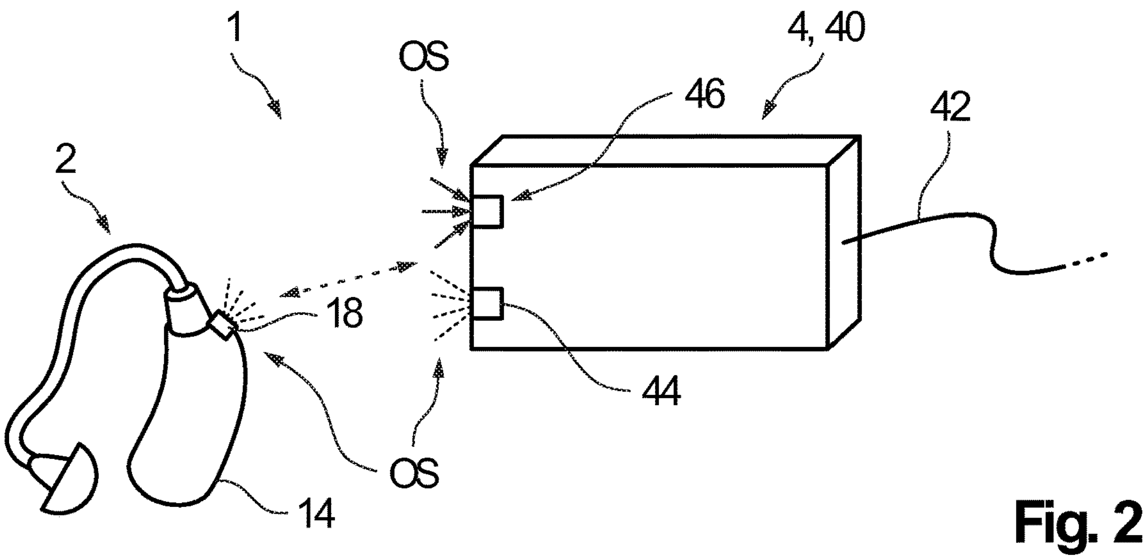
FIG. 2 is a further diagrammatic, perspective view of a further exemplary embodiment of the hearing instrument system, in which the third-party device forms a programming interface.

FIG. 2 diagrammatically shows an alternative or additional exemplary embodiment. The third-party device 4 is in the form of a programming interface 40 (or programming device) in this case. The programming interface 40 is used to transmit programming data to the hearing device 2 and, in the exemplary embodiment shown, is to this end connected by a cable 42 to a PC (not shown) on which programming software for the hearing device 2 is installed so as to be executable. The programming interface 40 includes an LED 44 that is used to output the optical signals OS and therefore to transmit data to the hearing device 2. This LED 44 is optionally also connected in such a way that it is also used to receive the optical signals OS that are output by the LED 18 of the hearing device 2. Alternatively, the programming interface 40 includes a photocell 46 that performs the function of the receiver.

The LED 30 in the case of the charger 6 and the LED 44 and possibly the photocell 46 in the case of the programming interface 40, form a respective (bidirectional) data transmission arrangement. The LEDs 30 and 44 are thus optionally connected to an appropriate controller as a receiver, as on the hearing device 2.

Figure 3:
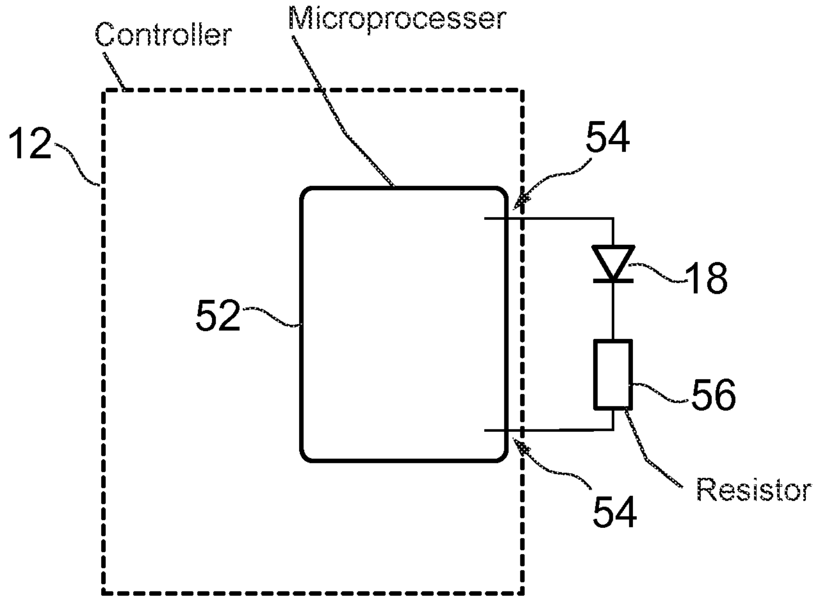
FIG. 3 is a further diagrammatic, detailed view of a controller of the hearing instrument system.

In FIG. 3 an exemplary embodiment of the controller 12 is shown. The controller 12 includes a microprocessor 52. The microprocessor 52 includes at least two general input/output pins 54 (or input/output ports). The LED 18 of the hearing device 2 is connected in series with a resistor 56 between the two general input/output pins 54.

The subject matter of the invention is not limited to the exemplary embodiments described above. Rather, further embodiments of the invention can be derived from the above description by a person skilled in the art. In particular, the individual features of the invention and the variant embodiments thereof that are described on the basis of the various exemplary embodiments can also be combined with one another in other ways.

The following is a summary list of reference numerals and the corresponding structure used in the above description of the invention.

LIST OF REFERENCE SIGNS

1 System
2 Hearing device
4 Third-party device
6 Charger
8 Microphone
10 Loudspeaker
12 Controller
14 Housing
16 Battery
18 LED
20 Charging interface
22 Lower part
24 Lid
26 Charging interior
28 Charging connection
30 LED
40 Programming interface
42 Cable
44 LED
46 Photocell
50 Smartphone
52 microprocessor
54 input/output pins
56 resistor
OS Optical signal

The invention claimed is:

1. A hearing instrument system, comprising:
a hearing instrument and a third-party device;
said hearing instrument including:
an input transducer for receiving signals being characteristic of acoustic events and for converting the signals into corresponding input signals,
an output transducer for outputting output signals derived from the input signals,
a controller configured to process the input signals and to generate the output signals from the input signals,
a housing for housing said input transducer and said controller, and
an LED connected to said controller for outputting optical signals and for receiving optical signals;
said controller of said hearing instrument configured to derive information from an optical signal received by said LED and to use the information to continue to operate said hearing instrument;
said third-party device configured to communicate with said hearing instrument through an optical data transmission arrangement using light signals;
said third-party device forming a box-shaped charger having a charging interior for receiving said hearing instrument, and said third-party device configured to transmit a charging light signal into said charging interior; and
said controller of said hearing instrument configured to take reception of the charging light signal by said LED as a basis for identification of said hearing instrument being disposed in said charging interior and for taking a measure related to said identification by deactivating at least one of a signal processing, a sound output or a sound capture or switching off said hearing instrument.

2. The hearing instrument system according to claim 1, wherein said hearing instrument and said third-party device are configured to communicate bidirectionally by using said LED of said hearing instrument or by using said optical data transmission arrangement.

3. The hearing instrument system according to claim 1, wherein said hearing instrument is configured to set up a wireless bidirectional communication connection to a fourth device having Internet capability, and said charger is configured to access a network address by using said optical data transmission arrangement of said charger through said hearing instrument.

4. The hearing instrument system according to claim 1, wherein said third-party device is configured to transmit programming data to said hearing instrument by using said optical data transmission arrangement.

5. The hearing instrument system according to claim 1, wherein said controller of said hearing instrument is configured to take the derived information as a basis for altering a setting parameter for processing the input signals.

6. The hearing instrument system according to claim 1, wherein said controller of said hearing instrument is configured to actuate said LED to emit a modulated light signal for bidirectional communication with said third-party device.

7. The hearing instrument system according to claim 1, wherein said controller has a general input/output connected to said LED.

8. The hearing instrument system according to claim 7, wherein said controller has a microprocessor with two general input/output pins, and said LED is connected in series with a resistor between said two general input/output pins.

* * * * *